United States Patent
Schran et al.

(10) Patent No.: US 9,558,371 B2
(45) Date of Patent: *Jan. 31, 2017

(54) SYSTEM FOR NETWORK ADMINISTRATION AND LOCAL ADMINISTRATION OF PRIVACY PROTECTION CRITERIA

(71) Applicant: ASCENTIVE LLC, Philadelphia, PA (US)

(72) Inventors: Adam R. Schran, Philadelphia, PA (US); Robert E. Darlington, Philadelphia, PA (US)

(73) Assignee: ASCENTIVE LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/880,471

(22) Filed: Oct. 12, 2015

(65) Prior Publication Data

US 2016/0140360 A1    May 19, 2016

Related U.S. Application Data

(63) Continuation of application No. 14/153,623, filed on Jan. 13, 2014, now Pat. No. 9,158,934, which is a continuation of application No. 13/280,405, filed on Oct. 25, 2011, now Pat. No. 8,631,045, which is a continuation of application No. 12/575,883, filed on Oct. 8, 2009, now Pat. No. 8,073,853, which is a continuation of application No. 09/820,054, filed on Mar. 28, 2001, now Pat. No. 7,603,356.

(60) Provisional application No. 60/264,382, filed on Jan. 26, 2001.

(51) Int. Cl.
*G06F 17/30* (2006.01)
*G06F 21/62* (2013.01)

(52) U.S. Cl.
CPC .................. *G06F 21/6263* (2013.01)

(58) Field of Classification Search
CPC combination set(s) only.
See application file for complete search history.

(56) References Cited

U.S. PATENT DOCUMENTS

| | | |
|---|---|---|
| 5,706,507 A | 1/1998 | Schloss |
| 5,740,549 A | 4/1998 | Reilly et al. |
| 5,749,549 A | 5/1998 | Ashjaee |
| 5,774,670 A | 6/1998 | Montulli |
| 5,826,242 A | 10/1998 | Montulli |

(Continued)

OTHER PUBLICATIONS

Attachment 1: Ascentive website as of Feb. 29, 2000 showing Ascentive products.
Cookie Cruncher Home Page, "Cookie Cruncher," printout from web site address: http://www.rbaworld.com/Programs/CookieCruncher, printout date: Mar. 19, 2000, 2 pgs.
Cookie Crusher Controls Web Cookies, printout from web site address: http://www.thelimitsoft.com/cookie.html, printout date: Apr. 19, 2000, 2 pgs.

(Continued)

*Primary Examiner* — Etienne Leroux
(74) *Attorney, Agent, or Firm* — Panitch Schwarze Belisario & Nadel LLP

(57) ABSTRACT

Cookie files are screened in a client machine, wherein a cookie file includes a cookie file source. A request from a subscriber is received at a server to send a list of untrusted cookie file sources to the client machine. The list of untrusted cookie file sources is downloaded from the server to the client machine. The downloaded list of untrusted cookie file sources is used to detect cookie files received at the client machine from cookie file sources on the downloaded list by comparing the cookie file source of any received cookie file to the untrusted cookie file sources on the downloaded list.

8 Claims, 6 Drawing Sheets

(56) References Cited

U.S. PATENT DOCUMENTS

| | | | |
|---|---|---|---|
| 5,864,848 | A | 1/1999 | Horvitz et al. |
| 5,974,429 | A | 10/1999 | Strub et al. |
| 5,991,878 | A | 11/1999 | McDonough et al. |
| 6,006,334 | A | 12/1999 | Nguyen et al. |
| 6,023,723 | A | 2/2000 | McCormick et al. |
| 6,085,224 | A | 7/2000 | Wagner |
| 6,092,194 | A | 7/2000 | Touboul |
| 6,237,033 | B1 | 5/2001 | Doeberl et al. |
| 6,282,709 | B1 | 8/2001 | Reha et al. |
| 6,286,001 | B1 | 9/2001 | Walker et al. |
| 6,473,756 | B1 | 10/2002 | Ballard |
| 6,651,217 | B1 | 11/2003 | Kennedy et al. |
| 6,678,731 | B1 | 1/2004 | Howard et al. |
| 6,851,060 | B1 | 2/2005 | Shrader |
| 7,216,292 | B1 | 5/2007 | Snapper et al. |
| 7,603,356 | B2 | 10/2009 | Schran et al. |
| 8,631,045 | B2 | 1/2014 | Schran et al. |
| 2001/0049620 | A1 | 12/2001 | Blasko |
| 2002/0019941 | A1 | 2/2002 | Chan et al. |
| 2002/0055912 | A1 | 5/2002 | Buck |
| 2002/0078177 | A1 | 6/2002 | Dutta |
| 2002/0078191 | A1 | 6/2002 | Lorenz |
| 2004/0230820 | A1 | 11/2004 | Hui Hsu et al. |
| 2010/0023999 | A1 | 1/2010 | Schran et al. |

OTHER PUBLICATIONS

"Cookie Pal," printout from web site address: http://www.cookiecentral.com/files.htm, printout date: Mar. 21, 2000, 4 pgs.

"Cookie Software (PC)," printout from web site address: http://www.cookiecentral.com/files.htm, printout date: Mar. 21, 2000, 4 pgs.

Junkbusters, "Alert on Web Privacy," printout from web site address: http://www.junkbusters.com/cgi-bin/privacy, printout date: Mar. 21, 2000, 2 pgs.

Junkbusters, "How Web Servers' Cookies Threaten Your Privacy," printout from web site address: http://www.junkbusters.com/ht/en/cookies.html, printout date: Mar. 21, 2000, 5 pgs.

Julien Jay, Norton Internet Security 2000—Review, printout from web site: http://activewin.com/reviews/software/utils/n/security/index.shtml, printout date: Nov. 15, 2005, 5 pgs.

Pcworld.com, Software Utilities, "Cookie Manager," printout from web site address: http://www.pcworld.com/top400/article/0,1361,15771+1+1,00.html, printout date: Apr. 19, 2000, 3 pgs.

Alexandra Krasne, Symantec Bundles Safe Surfing Tools, Oct. 19, 1999, printout from web site: http://www.cnn.com/TECH/computing/9910/19/symantec.bundle.idg/, printout date: Nov. 15, 2005, 3 pgs.

"Webroot's Window Washer," printout from web site address: http://www.webroot.com/washer.htm, printout date: Apr. 19, 2000, 5 pgs.

| WATCH LIST | PERSONAL TRUSTLIST | PERSONAL BLACKLIST | COOKIE SCRUBBED? |
|---|---|---|---|
| YES | NO | NO | YES |
| YES | YES | NO | NO |
| YES | NO | YES | YES |
| NO | YES | NO | NO |
| NO | NO | YES | YES |

*Fig. 5*

SYSTEM FOR NETWORK ADMINISTRATION AND LOCAL ADMINISTRATION OF PRIVACY PROTECTION CRITERIA

CROSS REFERENCE TO RELATED APPLICATION

This application is a continuation of U.S. application Ser. No. 14/153,623 filed Jan. 13, 2014, which, in turn, is a continuation of U.S. application Ser. No. 13/280,405 filed Oct. 25, 2011, now U.S. Pat. No. 8,631,045, which, in turn, is a continuation of U.S. application Ser. No. 12/575,883 filed Oct. 8, 2009, now U.S. Pat. No. 8,073,853, which, in turn, is a continuation of U.S. application Ser. No. 09/820,054 filed Mar. 28, 2001, now U.S. Pat. No. 7,603,356. Each of the above-identified applications are incorporated herein by reference in their entirety.

This application claims the benefit of U.S. Provisional Application No. 60/264,382 filed Jan. 26, 2001, entitled "SYSTEM AND METHOD FOR NETWORK ADMINISTRATION AND LOCAL ADMINISTRATION OF PRIVACY PROTECTION CRITERIA."

BACKGROUND OF THE INVENTION

The interactive nature of the World Wide Web has proved to be a powerful marketing tool, allowing businesses and consumers to communicate on a one-to-one basis. A cookie file (also know simply as a "cookie") is a tool used on the web to facilitate and interpret this one-to-one interaction. Cookie files offer businesses the potential for more effective direct marketing of goods, services and information. For many e-businesses that operate over the Internet, cookie files are considered to be vital to the future success of on-line advertising and thus the generation of future business.

A cookie file is a small file that is stored on an individual's computer. The cookie file allows a website to tag the browser of the individual's computer with a unique identification. When the individual visits the website, a server at the website requests a unique identifier from the browser of the individual's computer. If the unique identifier is not received, the server delivers one, in the form of a cookie file, to the individual's computer, where it is stored for future access by that particular server.

Many cookie files used by on-line business actually benefit on-line computer users, such as by providing easy access to a website that an on-line computer user desires to interface with on a regular basis. Cookie files may be used by advertisers to avoid repeatedly showing the same advertisement (e.g., a banner) to the same on-line computer user. Additionally, cookie files make it easy for consumers to shop on their favorite websites. Once a consumer returns to a previously visited website where he or she purchased one or more items, the consumer can conveniently purchase additional items without having to re-enter his or her credit card number or shipping address, assuming that the consumer is using the same computer and a cookie file was stored in it during the consumer's first visit.

Cookie files are also used to track information about an on-line computer user's behavior. It is believed by many that cookie files invade a computer user's privacy because they reveal the user's identity and link it to the user's history of Internet usage. Thus, a cookie file may be used as a tool of surveillance by monitoring the computer user's browser and revealing website addresses that the computer user visits to the entity that "planted" the cookie file. Additionally, businesses that receive information obtained from using cookie files may share such information with other businesses. Thus a privacy issue may arise due to companies that abuse the technology of using cookie files. When linked to tracking databases, the storage of cookie files may reveal a particular person's most private information, such as their medical or financial history. Some companies further extend the privacy threat by cross-referencing cookie file identifiers with massive off-line marketing databases.

Several software programs have been developed and are on the market for the purpose of screening cookie files. Internet Explorer and Netscape allow a computer user to set the computer's browser such that all received cookie files are either automatically accepted (enabled) or rejected (disabled). In another user selectable browser mode, the computer user is prompted for a decision every time an individual cookie file is received.

There are software programs that let users create a profile of which types of cookie files they will accept. However, there is no guarantee that cookie files generated by companies with a history of abusing the use of cookie files will be screened out, nor is there a universal reference source for determining which cookie file sources should not be accepted. What is needed is a professional service that constantly researches and evaluates cookie file sources (e.g., websites), cookie files, consumer complaints and other statistical data, and develops and electronically distributes to subscribing computer users, on a periodic basis, a list of those cookie file sources that the service recommends should not be permitted to store cookie files in the subscribing user's computer. What is also needed is a user-friendly interface for enabling a user to easily and automatically modify the distributed list once it is received by the user's computer, such that the user may customize the list to meet his or her individual or organizational requirements.

BRIEF SUMMARY OF THE INVENTION

Cookie files received from cookie file sources (e.g., Internet websites) are screened based upon the recommendations of a service provider which downloads privacy protection criteria in the form of a "watch list" to a subscriber's client machine. A user-friendly interface allows the subscriber to optionally modify the watch list prior to it being used at the subscriber's client machine by assigning known cookie file sources to either a "trustlist" or a "blacklist." A "composite list" is then generated and used by the client machine to screen cookie files. The subscriber receives updates from the service provider on either a periodic or "as-needed" basis using a "quick update algorithm." A "privacy scanning algorithm" runs on the client machine and has two different modes of operation. The first is a continuous mode where unwanted cookie files are blocked from being stored at the client machine. The second is a periodic mode where the client machine is "scrubbed" of unwanted cookie files according to the privacy protection criteria.

The present invention allows a user to screen cookie files to determine which cookie files should be stored in the user's client machine (e.g., computer) based on the professional recommendations of a service provider. Through a user-friendly interface, the user is able to modify the recommendations of the service provider as desired, by creating one or more exception lists. The exception lists indicate specific cookie file sources that the user has designated as being allowed or not being allowed to be stored in the user's client machine. A composite list is generated as a result of modifying the service provider's recommendations according to the user's exception lists. The composite list is used to determine which cookie files already stored in the client machine may remain and which should removed.

A method of screening cookie files in a client machine in accordance with the present invention is now described. A server of a service provider that makes professional recommendations regarding the handling of cookie files receives a request to send a list of cookie file sources to the client machine. The request is received from an individual (a "subscriber") subscribing to services provided by the service provider. The individual is a user of the client machine. In response to the request, the server downloads the list of cookie file sources to the client machine. The downloaded list is used to detect cookie files received at the client machine from sources on the downloaded list.

A first exception list may be created by the subscriber to include the identity of sources that are permitted to store cookie files in the client machine. The sources in the first exception list may or may not be included on the downloaded list. A second exception list may also be created to include the identity of sources that are not permitted to store cookie files in the client machine. The sources in the second exception list may or may not be included on the downloaded list. The professional service provider creates the downloaded list. The subscriber creates the first and second exception lists. The downloaded list may then be modified in accordance with the first and second exception lists where any cookie file. A separate composite list may be generated instead of modifying the downloaded list. The composite list may include the cookie file sources on the downloaded list, plus any cookie file sources on the first exception list, minus any cookie file sources on the second exception list that also appear on the downloaded list. Updates of the downloaded list may be received from the server on a periodic basis. Once the downloaded list is modified or a composite list is generated, the client machine may display a message indicating that a cookie file received from a source on the downloaded list has been detected. Detected cookie files stored in the client machine may be removed. Detected cookie files may be prevented from being stored in the client machine.

In an embodiment of the present invention, a first method of creating a composite list of cookie file sources in a client machine is now described. A first exception list is created. The first exception list includes the identity of sources that are permitted to store cookie files in the client machine. A second exception list is also created. The second exception list includes the identity of sources that are not permitted to store cookie files in the client machine. A master list of cookie file sources is received at the client machine from a service provider that makes professional recommendations regarding the handling of cookie files. The master list is then modified in accordance with the first and second exception lists. Thus, the composite list is the modified master list. Updates of the master list may be received from the service provider on a periodic basis. Stored cookie files received at the client machine from sources on the composite list may be removed. Cookie files received at the client machine from sources on the composite list may be prevented from being stored in the client machine.

In another embodiment of the present invention, a second method of creating a composite list of cookie file sources in a client machine is now described. A master list of cookie file sources is received at the client machine from a service provider that makes professional recommendations regarding the handling of cookie files. Cookie file sources from the master list that correspond to one or more trusted cookie file sources listed in the client machine are deleted. Cookie file sources that correspond to one or more untrusted cookie file sources listed in the client machine are added to the master list. Cookie files stored in the client machine and which are received from sources on the composite list may be removed. Cookie files received at the client machine from sources on the composite list are prevented from being stored in the client machine.

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings:

FIG. 5 shows an example of a logic table of a privacy scanning algorithm in accordance with the present invention.

DETAILED DESCRIPTION OF THE INVENTION

Certain terminology is used herein for convenience only and is not to be taken as a limitation on the present invention. A "watchlist" or "watch list" or "master list" (hereinafter, "watch list") is a list containing privacy protection criteria (e.g., a list of cookie file sources that are not trusted as designated by the service provider) that is downloaded to a client machine from a server of a service provider that provides professional recommendations. A "trust list" or "trustlist" or "first exception list" or "personal trustlist" (hereafter, "trustlist"), also contains exemptions to the privacy protection criteria included in the watch list (e.g., a list of cookie file sources that are trusted as designated by the user of the client machine). A "black list" or "blacklist" or "second exception list" or "personal blacklist" (hereafter, "blacklist"), contains exemptions to the privacy protection criteria included in the watch list (e.g., a list of cookie file sources that are not trusted as designated by a user of the client machine). The criteria contained in the watch list is generated by the service provider. The criteria in the blacklist and trustlist is generated by the user of the client machine. Criteria in the blacklist and trustlist supersede the criteria in the watch list. A "composite list" (a modified version of the watch list) contains privacy protection criteria which is stored in the client machine. The composite list is created by subtracting exemptions on the trustlist (if any) from the criteria on the watch list and adding the remaining criteria to the exemptions on the blacklist (if any). A "cookie file source" is a website, an e-business or any other entity that sends cookie files. A "client machine" is an apparatus which generally works directly for users, providing computational power and other "general purpose" tools. A client machine also provides one or more users with access to stored files. A computer is an example of a client machine.

Figure 1:
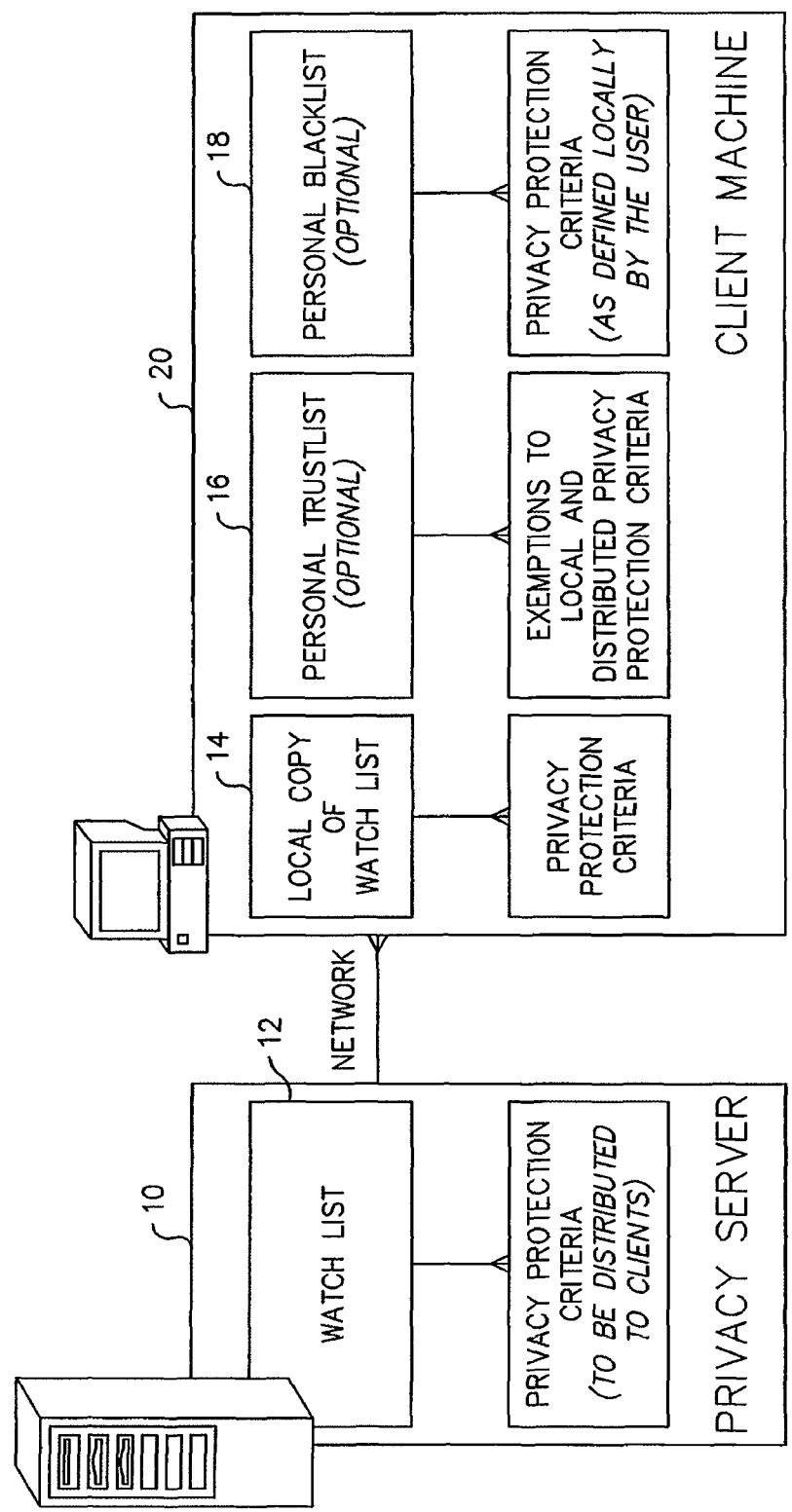
FIG. 1 shows an arrangement of a privacy server and a client machine in accordance with the present invention.

As shown in FIG. 1, the present invention begins with the use of a privacy server 10, which maintains a watch list 12 of privacy protection criteria (e.g., a list of untrusted cookie file sources) and sends over a network a local copy of the watch list 14 to client machine 20 in response to a request received from a subscribing user of client machine 20. Software resident in the client machine 20 may optionally contain two user-customized sets of supplemental privacy protection criteria to be used in conjunction with the watch list. The user-customized sets are called a blacklist and a trustlist which contain exemptions to the watch list and are stored in the client machine. In one preferred embodiment of the present invention, a composite list of privacy protection criteria may be created by subtracting exemptions on the trustlist from the watch list and adding exemptions on the black list to the remaining privacy protection criteria on the watch list. The composite list may be the same as the local copy of the watch list 14 after it has been modified, or the composite list may be a separate list stored in the client machine 20 along with the local copy of the watch list 14, the trustlist 16 and the blacklist 18. In an alternate embodiment, an algorithm (e.g., a software program) may be used to read the contents of the local copy of the watch list 14, the trustlist 16 and the blacklist 18, and screen cookie files without modifying any of the lists or adding an additional list.

Three main objects are used by the present invention: the watch list 12, the trustlist 16 and the blacklist 18. The watch list 12 is essentially a managed security list containing privacy protection criteria which is stored on the server 10. A local copy of the watch list 14 is distributed to the client machine 20 via a subscription process. The trustlist 16 and blacklist 18 are maintained by the user on the client machine. Each of these three lists is made up of one or more uniform resource locators (URLs) which are used as privacy protection criteria. The client machine's software contains the user managed privacy data preferences and retrieves the managed watch list 12 from the server 10. The privacy data referenced above can take several forms, most commonly that of a web site, URL, or other cookie blocking or accepting criteria. The privacy data may take the form of a list of web sites for which the local storage of cookie files in the client machine is to be prohibited. The state management protocol of a cookie file may store unique or identifying information about the user, the user's session or the users' Internet account.

The watch list 12 is a compilation of privacy protection criteria distributed to the client machine 20 from a central privacy server 10 over a network. The watch list 12 may include Internet sites, which may use cookie files to store unique or identifying information about the client machine software user. The watch list 12 is maintained by a service provider and stored on an Internet accessible hypertext transfer protocol (HTTP) server 10.

The trustlist 16 is a list of exemptions to the privacy protection criteria, which may or may not be included in the local copy of the watch list 14. The trustlist 16 may include Internet sites, which may use cookie files to store unique or identifying information about the client machine user. The trustlist is customized and maintained by the client machine user. It contains those Internet sites that the user trusts, and those sites are allowed to download their cookie files to the user's client machine.

The blacklist 18 is a locally maintained list of privacy protection criteria to be merged with the local copy of the watch list 14. The blacklist 18 may include those Internet sites that should be blocked from creating cookie files to store unique or identifying information about the client machine software user. Like the trustlist 16, the blacklist 18 may also be customized and maintained by the client machine user. The blacklist 18 may include those Internet sites that the user does not trust, and the cookie files from those sites are removed from the user's client machine.

In one preferred embodiment of the present invention, the composite list may be a combination of the local copy of the watch list 14, the trustlist 16 and the blacklist 18. The composite list begins with the same contents as the local copy of the watch list 14. Any privacy protection exemptions contained on the trustlist 16 that are also in the composite list are removed from the composite list. Next, any privacy protection exemptions in the blacklist 18 that are not already on the composite list are added to the composite list. The composite list is then used as a master list of privacy protection criteria to be used to protect the client.

Figure 2:
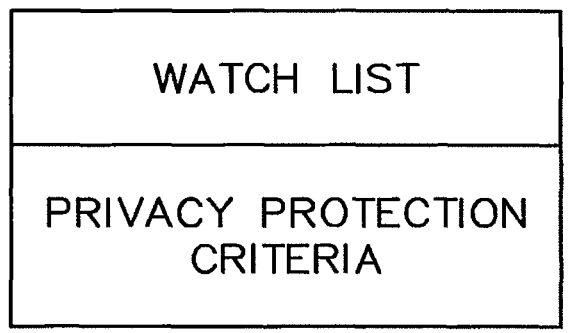
FIG. 2 shows a data structure of a watch list on the privacy server in accordance with the present invention.

FIG. 2 shows the data structure of the watch list 12 on the privacy server 10. The watch list is simply a collection of privacy protection criteria. In one preferred embodiment of the present invention, this privacy protection criteria takes the form of cookie files that may be rejected by the client machine 20.

Figure 3:
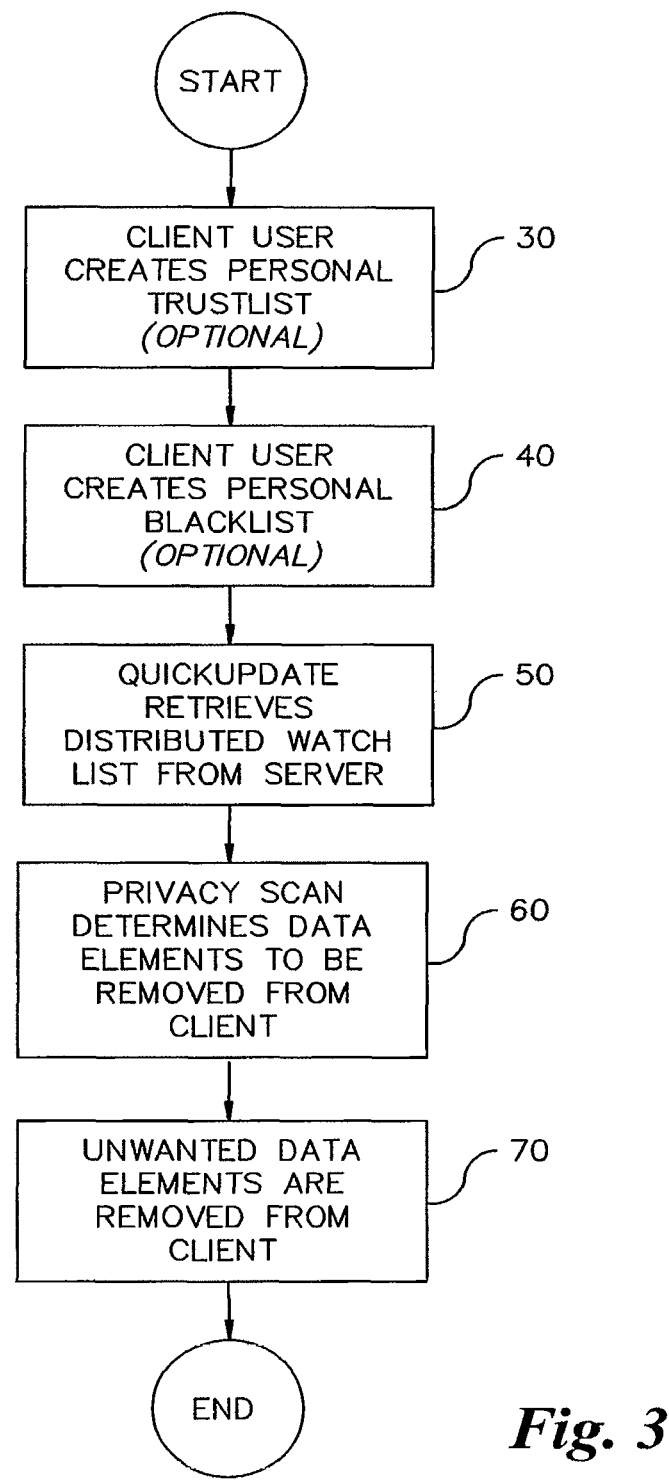
FIG. 3 shows a high-level functional flowchart in accordance with the present invention.

FIG. 3 shows a high-level functional flowchart that demonstrates the process of comparing data elements distributed to the client machine 20 to a locally created composite list of privacy protection criteria and determining which of those elements should be removed from the client machine 20. As shown in block 30, the service provider for privacy server 10 allows the client machine user to create and maintain an optional trustlist 16 on the client machine 20 which contains privacy protection criteria that the user would like to remove from the local copy of the watch list 14. As shown in block 40, the service provider also allows the client machine user to create and maintain an optional blacklist 18 which contains privacy protection criteria that the user would like to add to the local copy of the watch list 14. As shown in block 50, the service provider employs an algorithm which quickly retrieves the most recent version of the watch list 12 from the privacy server 10. The watch list 12 is maintained on the privacy server 10 and contains a predefined set of privacy protection criteria, which the user of client machine 20 subscribes to. The client machine user may manually request at any time that the most up-to-date privacy protection criteria available be downloaded to the client machine 20 from the privacy server 10. This process can also be run automatically by a software application at regularly scheduled intervals.

Figure 4:
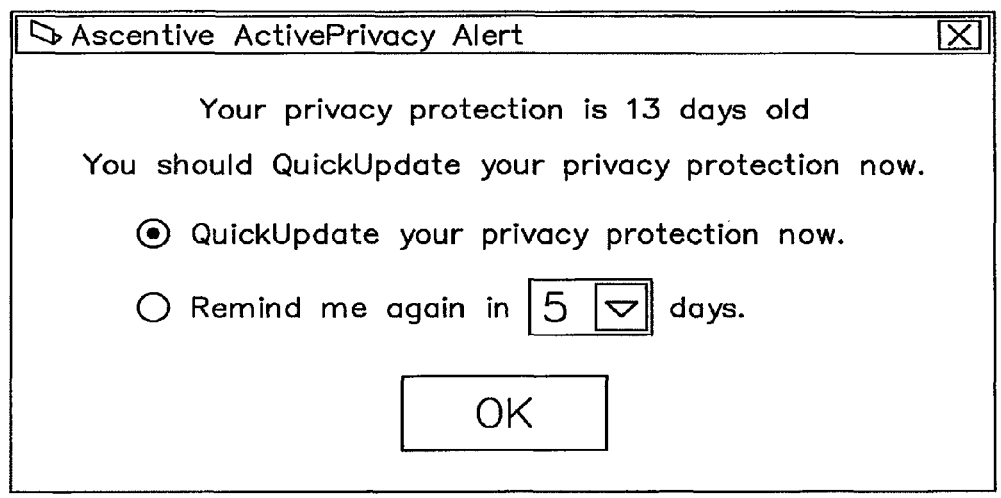
FIG. 4 shows a menu option allowing a user for updating privacy protection in accordance with the present invention.

As shown in FIG. 4, the client machine user may also be presented with a displayed alert that gives the user the option of updating the privacy protection criteria immediately. The client machine user can also select a future time (e.g., 5 days from today) at which the user is to be reminded to request that the local copy of the watch list 14 be updated.

Referring again to FIG. 3, in block 60 the service provider employs a privacy scan algorithm to determine those unwanted cookie files that should be removed from the client machine. As shown in block 70, unwanted data cookie files are then removed from the client machine.

Two distinct algorithms are employed to implement the present invention. A "quick update algorithm" is used to synchronize the local copy of the watch list 14 with the watch list 12 stored on the privacy server 10. A "privacy scanning algorithm" is used to implement the privacy protection criteria included in the composite list. The privacy scanning algorithm detects unwanted cookie files and scrubs them from the client machine 20.

The quick update algorithm will now be described. The client machine user subscribes to the service provider in order to receive the local copy of the watch list 14. If authentication is being used, when the client machine 20 connects to the server 10, authentication is performed to ensure that the client machine user is registered to receive watch list updates. If the user is properly registered, after authentication, an updated watch list is distributed to the client machine 20. If the user does not pass authentication, the update is not distributed. The service provider determines whether or not the quick update algorithm may be utilized with or without authentication.

Referring now to FIG. 5, the privacy scanning algorithm will now be described. The privacy scanning algorithm is employed to remove unwanted cookie files from the client machine 20. In order to do this successfully, the privacy scanning algorithm makes use of the following components of the client software: a watch list distributed from the server 10, a trustlist 16 and a blacklist 18. The privacy scanning algorithm compares the privacy protection data on the client machine 20 to that on the composite list compiled from the local copy of the watch list 14, the trustlist 16 and the blacklist 18. The privacy scanning algorithm determines which cookie files are to be removed (scrubbed) from the client machine 20 by analyzing the privacy protection criteria residing within the local copy of the watch list 14, the trustlist 16 and the blacklist 18. As depicted in the table shown in FIG. 5, if a cookie file is listed on the watch list, but not on the trustlist, the cookie file will be scrubbed or blocked. Any time that a cookie file appears on the trustlist, the cookie will be accepted by the client machine 20 regardless of whether or not it appears on the watch list. Any time that a cookie file appears on the blacklist, the cookie file will be scrubbed or blocked regardless of whether or not it appears on the watch list. The Privacy Scanning Algorithm may be carried out in either of two modes. The first is a continuous mode. In the continuous mode, the privacy scanning algorithm runs continuously and blocks unwanted cookie files from being downloaded to the client machine. The second is a periodic mode. In the periodic mode, the Privacy Scanning Algorithm is executed at a regular interval, specified by the user, to detect and remove unwanted cookie files from the client machine.

Figure 6:
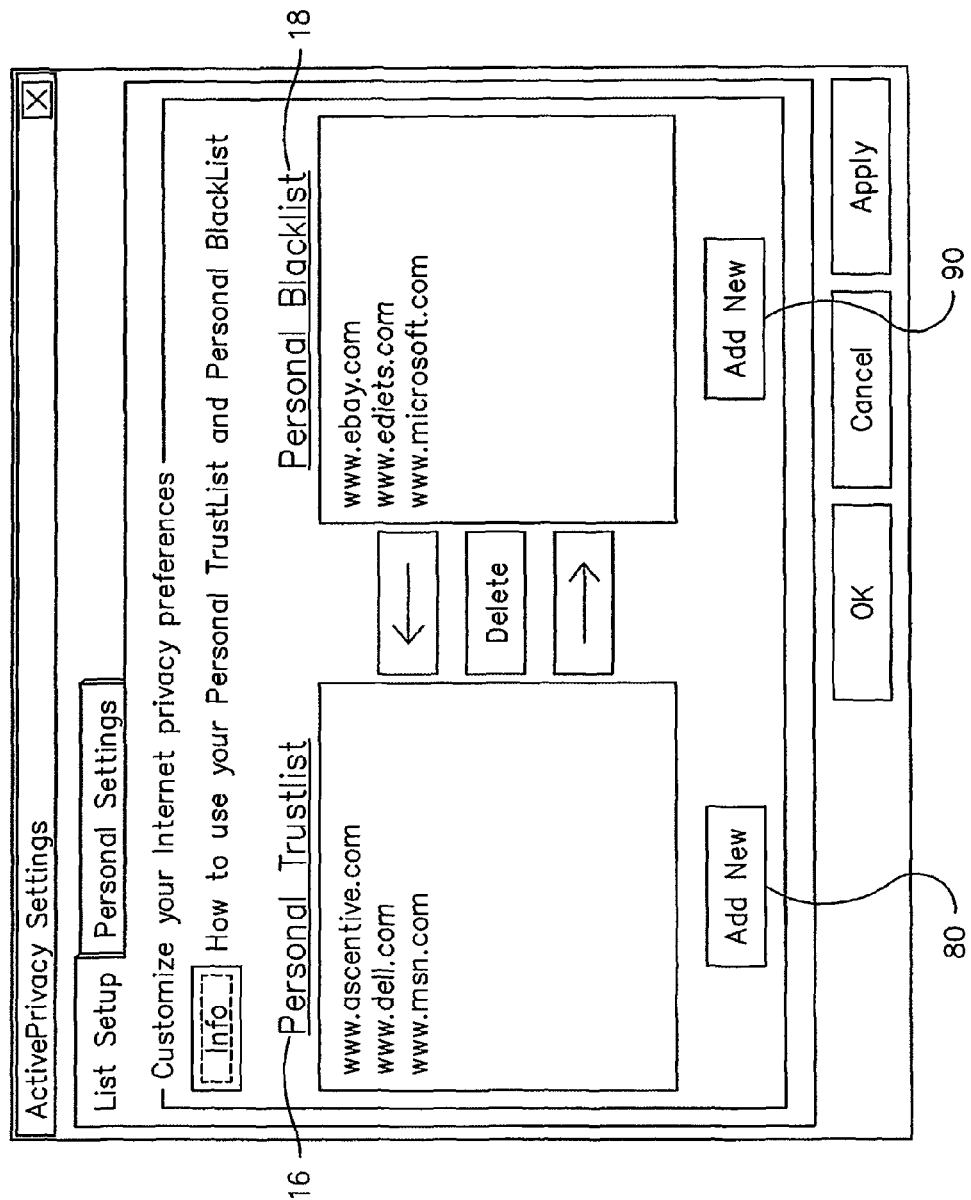
FIG. 6 shows a user-friendly interface for modifying the watch list in accordance with the present invention.

FIG. 6 shows a user-friendly interface in accordance with the present invention which allows client machine users to personalize a trustlist 16 and blacklist 18. When either "Add New" button 80, 90, is clicked, the user is prompted to enter an Internet domain. The interface allows users to customize these two lists of Internet domains. The user can move a domain from one list to the other, delete a domain from either list, or add a domain to either list. In addition, the interface prevents an Internet domain from being placed on both the trustlist 16 and the blacklist 18. FIG. 6 shows an example of the interface with the trustlist 16 and blacklist 18 populated. Using this example, the following domains will be trusted and the service provider will allow their cookie files to be downloaded to the client: www.ascentive.com, www.msn.com and www.dell.com. Also, based on this example, the following domains will not be allowed to download a cookie to the client: www.ebay.com, www.ediets.com and www.microsoft.com.

In addition to using a combination of a watch list, a trustlist and a blacklist to create a composite list for detecting unwanted cookie files on a client machine, a software application running on the client machine 20 in accordance with the present invention may provide further functionality to the user. This functionality may include the ability for the client machine user to manually launch the privacy scan, to manually retrieve the latest watch list from the server 10, to customize the trustlist and blacklist, to view client cookie files, to select and manually delete cookie files, and to enable/disable privacy scanning.

The present invention is capable of running on any hardware configuration that is used as part of today's technology. In order to retrieve the latest watch list and update the composite list used by the present invention, the client machine software must be able to connect to an HTTP server.

The present invention is capable of working with any computer operating system. However, in today's modern marketplace, Microsoft Windows is the most commonly used computer operating system. Therefore, the present invention may be used with the Microsoft Windows operating system in the following versions: Windows 95, Windows 98, Windows Me, Windows NT and Windows 2000. In order to subscribe to the distributed watch list using the present invention's quick update functionality, the client machine software must have connectivity to the Internet.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A system for screening cookie files, wherein a cookie file includes a cookie file source, the system comprising:
   (a) a server that maintains a list of untrusted cookie file sources which are downloadable upon request; and
   (b) a client machine configured to:
      (i) transmit a request to the server for the list of untrusted cookie file sources,
      (ii) receive the list of untrusted cookie file sources downloaded from the server,
      (iii) use the downloaded list of untrusted cookie file sources to detect cookie files received at the client machine from cookie file sources on the downloaded list by comparing the cookie file source of any received cookie file to the untrusted cookie file sources on the downloaded list, and
      (iv) perform at least one of:
         (A) removing stored cookie files received at the client machine from cookie file sources on the downloaded list by (I) comparing the cookie file source of stored cookie files to the cookie file sources on the downloaded list, and (II) removing any stored cookie files that have matching cookie file sources, and
         (B) preventing cookie files received at the client machine from cookie file sources on the downloaded list from being stored in the client machine by (I) comparing the cookie file source of received cookie files to the cookie file sources on the downloaded list and, (II) preventing storage of any received cookie files that have matching cookie file sources.

2. The system of claim 1 wherein the client machine is further configured to:
   (v) create at least one of a first exception list including the identity of cookie file sources that are permitted to store cookie files in the client machine, and a second exception list including the identity of cookie file sources that are not permitted to store cookie files in the client machine; and
   (vi) modify the downloaded list in accordance with the at least one of a first and second exception lists wherein the removal of cookie files or the storage prevention of cookie files is performed using the modified downloaded list.

3. The system of claim 1 wherein the client machine is further configured to:
   (v) receive updates of the downloaded list from the server on a periodic basis.

4. The system of claim 1 wherein the client machine is further configured to:
   (v) display a message at the client machine indicating that a cookie file received from a cookie file source on the downloaded list has been detected.

5. A system for screening cookie files, wherein a cookie file includes a cookie file source, the system comprising:
   (a) a server that maintains a software application that includes a list of untrusted cookie file sources; and
   (b) a client machine configured to:
      (i) transmit a request to the server to download the software application that includes the list of untrusted cookie file sources,
      (ii) receive the downloaded software application that includes the list of untrusted cookie file sources from the server;
      (iii) use the downloaded list of untrusted cookie file sources to detect cookie files received at the client machine from cookie file sources on the downloaded list by comparing the cookie file source of any received cookie file to the untrusted cookie file sources on the downloaded list; and
      (iv) perform at least one of:
         (A) removing stored cookie files received at the client machine from cookie file sources on the downloaded list by (I) comparing the cookie file source of stored cookie files to the cookie file sources on the downloaded list, and (II) removing any stored cookie files that have matching cookie file sources, and
         (B) preventing cookie files received at the client machine from cookie file sources on the downloaded list from being stored in the client machine by (I) comparing the cookie file source of received cookie files to the cookie file sources on the downloaded list and, (II) preventing storage of any received cookie files that have matching cookie file sources.

6. The system of claim 5 wherein the client machine is further configured to:
   (v) create at least one of a first exception list including the identity of cookie file sources that are permitted to store cookie files in the client machine, and a second exception list including the identity of cookie file sources that are not permitted to store cookie files in the client machine; and
   (vi) modify the downloaded list in accordance with the at least one of a first and second exception lists wherein the removal of cookie files or the storage prevention of cookie files is performed using the modified downloaded list.

7. The system of claim 5 wherein the client machine is further configured to:
   (v) receive updates of the downloaded list from the server on a periodic basis.

8. The system of claim 5 wherein the client machine is further configured to:
   (v) display a message indicating that a cookie file received from a cookie file source on the downloaded list has been detected.

\* \* \* \* \*